(12) United States Patent
Sayers

(10) Patent No.: US 6,527,411 B1
(45) Date of Patent: Mar. 4, 2003

(54) COLLIMATING LAMP

(75) Inventor: Edwin Mitchell Sayers, Saline, MI (US)

(73) Assignee: Visteon Corporation, Dearborn, MI (US)

(*) Notice: Subject to any disclaimer, the term of this patent is extended or adjusted under 35 U.S.C. 154(b) by 0 days.

(21) Appl. No.: 09/629,350

(22) Filed: Aug. 1, 2000

(51) Int. Cl.$^7$ ................................................. F21V 7/06
(52) U.S. Cl. ........................ 362/245; 362/237; 362/241; 362/551; 362/555; 362/318; 362/349
(58) Field of Search .................... 362/237, 241–248, 362/551, 555, 559, 560, 561, 318, 230, 231, 26, 235, 236, 249, 349, 544, 545, 511

(56) References Cited

U.S. PATENT DOCUMENTS

| | | | | |
|---|---|---|---|---|
| 1,278,026 A | * | 9/1918 | Salto ............................ | 362/241 |
| 1,618,425 A | * | 2/1927 | Giese ........................... | 362/247 |
| 4,163,883 A | * | 8/1979 | Boulanger ................... | 362/551 |
| 4,441,783 A | * | 4/1984 | Houghton et al. ........... | 362/300 |
| 4,630,177 A | * | 12/1986 | Von Kohorn et al. ....... | 362/551 |
| 4,631,642 A | | 12/1986 | Brun .............................. | 362/581 |
| 4,767,172 A | | 8/1988 | Nichols et al. ............... | 385/146 |
| 4,835,666 A | * | 5/1989 | Feger et al. .................. | 362/231 |
| 4,929,866 A | | 5/1990 | Murata et al. ................ | 313/500 |
| 4,935,665 A | | 6/1990 | Murata ......................... | 313/500 |
| 5,136,483 A | | 8/1992 | Schoniger et al. ........... | 362/231 |
| 5,155,666 A | * | 10/1992 | Radford et al. .............. | 362/241 |
| 5,174,649 A | | 12/1992 | Alston ........................... | 362/244 |
| 5,268,823 A | * | 12/1993 | Yergenson .................... | 362/555 |
| 5,375,043 A | * | 12/1994 | Tokunaga ..................... | 362/560 |
| 5,471,371 A | | 11/1995 | Koppolu et al. ............. | 362/307 |
| 5,486,984 A | | 1/1996 | Miller ........................... | 362/560 |
| 5,488,545 A | * | 1/1996 | Kato et al. .................... | 362/551 |
| 5,678,914 A | * | 10/1997 | Dealey et al. ................ | 362/551 |
| 5,704,709 A | * | 1/1998 | Zwick et al. ................. | 362/245 |
| 5,752,760 A | * | 5/1998 | Dealey, Jr. et al. .......... | 362/551 |
| 5,779,341 A | | 7/1998 | Chinniah et al. ............. | 362/308 |
| 5,988,842 A | | 11/1999 | Johnsen et al. .............. | 362/551 |
| 6,079,854 A | * | 6/2000 | Ra ................................. | 362/551 |
| 6,129,448 A | * | 10/2000 | Takasaki et al. ............. | 362/544 |
| 6,193,383 B1 | * | 2/2001 | Onikiri et al. ................ | 362/31 |
| 6,241,358 B1 | * | 6/2001 | Higuchi et al. ............... | 362/237 |

FOREIGN PATENT DOCUMENTS

| | | | | |
|---|---|---|---|---|
| EP | 0362993 A | | 8/1989 | |
| GB | 2282700 A | | 4/1995 | |
| JP | 62-2617 | * | 1/1987 | ................ 362/551 |

* cited by examiner

*Primary Examiner*—Alan Cariaso
(74) *Attorney, Agent, or Firm*—MacMillan, Sobanski & Todd, LLC

(57) ABSTRACT

A lamp for emanating light has two or more light units assembled together. Each light unit comprises a light pipe having side surfaces to direct light from a light receiving end to a light exiting end and a light source. Each light pipe has a dedicated light source.

18 Claims, 5 Drawing Sheets

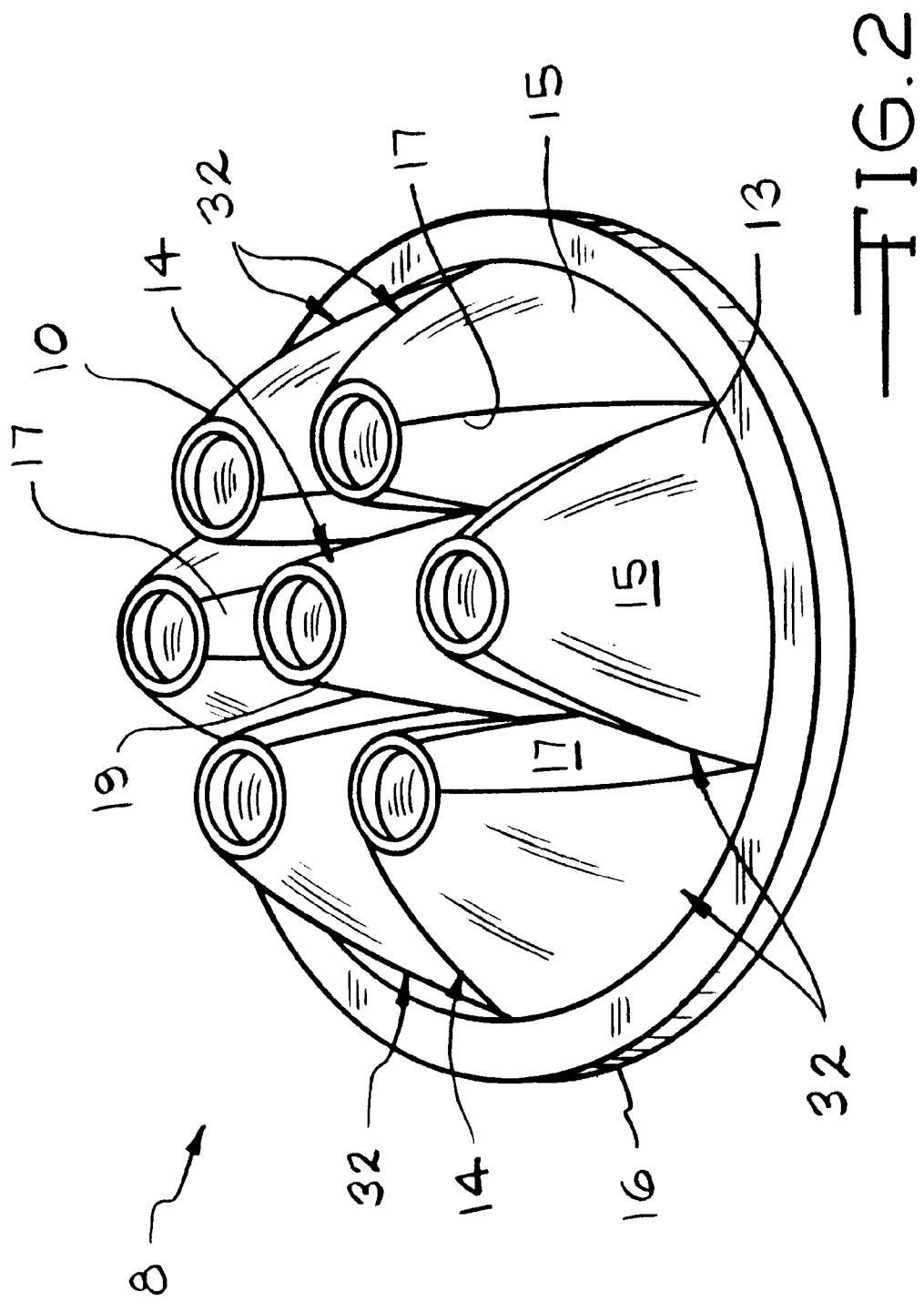

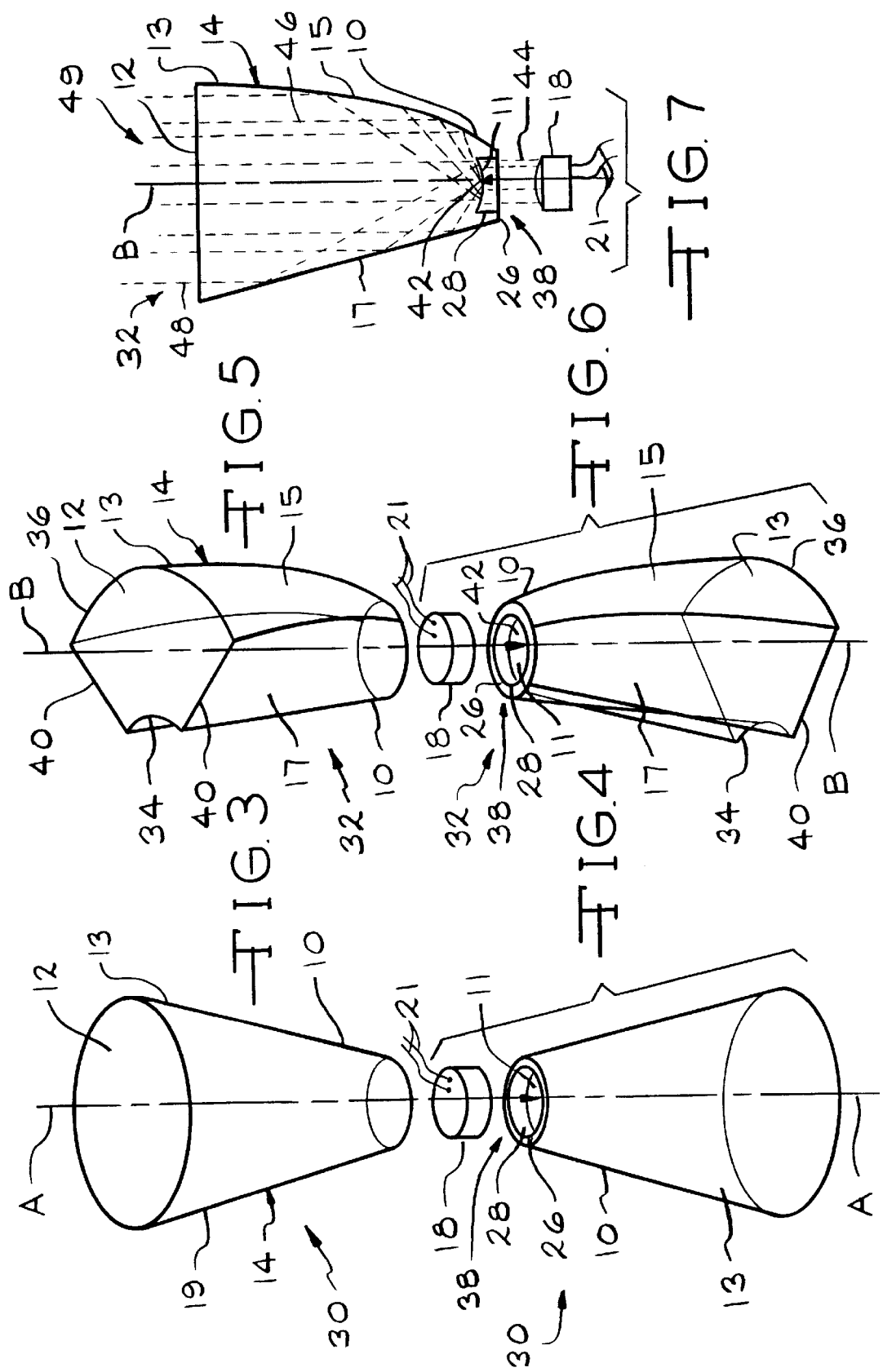

COLLIMATING LAMP

TECHNICAL FIELD

This invention relates to an efficient means of and device for collimating light. One of a number of useful applications is in producing signal lights for automobiles.

BACKGROUND OF THE INVENTION

Lamps of the type used for signal lights typically are comprised of a light source, such as an incandescent bulb, a lens, and a reflector or collimating surface for directing the light toward the lens. Sometimes, more than one bulb is used. In some lamps, light-emitting diodes (LED's) are used instead of incandescent bulbs. LED's emit light in proportion to the forward current through the diode. LED's are low voltage devices that have a longer life than incandescent lamps. They respond quickly to changes in current. They produce a spectrum of light that is well defined and constrained. Transmission of a series of light beams through light pipes can be used in automobile lighting systems, including signal lights and head beams. Light pipes typically have a light receiving end and a light exiting end, and are continuous through the entirety of their cross section, and usually consist of a material that has an index of refraction significantly higher than that of air.

SUMMARY OF THE INVENTION

The above objects as well as other objects not specifically enumerated are achieved by a lamp for emanating light having two or more light units assembled together. Each light unit comprises a light pipe having side surfaces to direct light from a light receiving end to a light exiting end and a light source. Each light pipe has a dedicated light source.

According to this invention there is also provided a lamp for emanating light having at least one light unit. Each light unit comprises a light source and a light pipe. Each light pipe has a light receiving surface to introduce light from the light source into the solid light pipe in the form of an intra-solid beam, a light exiting surface through which the light exits the light pipe, and a side surface.

According to this invention there is also provided a lamp for emanating light comprising one or more light pipes to direct light from a light receiving end to a light exiting end and one or more light sources for introducing light into the light pipes. Each light pipe has a side surface. A substantial portion of the side surface is generally parabolic in shape.

According to this invention there is also provided a lamp for emanating light including one or more light units. Each light unit comprises a light source; and a light pipe for directing light from the light source. The light pipe has a light receiving end having a light receiving surface and a receptacle to position the light source with respect to the light receiving end of the light pipe.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a bottom view in perspective of the lamp of FIG. 1.

FIG. 3 is a top view in perspective of a center light pipe of the lamp of FIG. 1.

FIG. 4 is a bottom view in perspective of a center light pipe.

FIG. 5 is a top view in perspective of an adjacent light pipe.

FIG. 6 is a bottom view in perspective of an adjacent light pipe.

FIG. 7 is a cross-sectional view in elevation of a light unit of the invention.

DETAILED DESCRIPTION AND PREFERRED EMBODIMENTS OF THE INVENTION

Figure 1:
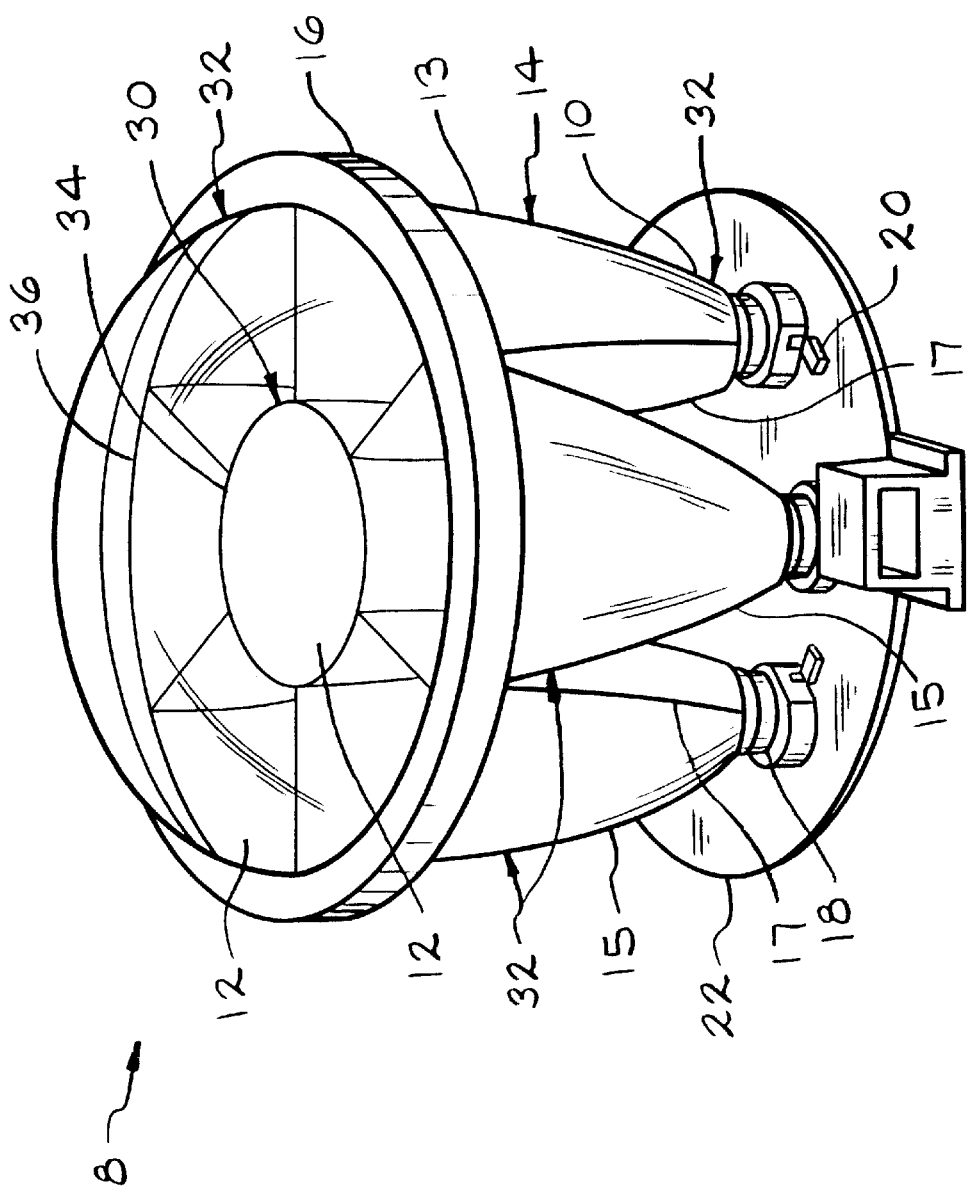
FIG. 1 is a top view in perspective of a lamp according to the invention.

As shown in FIGS. 1 and 2, a lamp 8 generally includes a center light pipe 30 and a plurality of adjacent light pipes 32. The center light pipe 30 and each adjacent light pipe 32 includes one or more side surfaces 14. The side surfaces 14 are preferably generally smooth. At least a portion of the side surfaces 14 may be a generally curved surface 15. Other portions of the surface may be generally flat, such as flat surface 17 or conical, such as conical surface 19. The light pipes 30, 32 preferably have at least one surface that is generally parabolic in shape.

A preferred embodiment of the lamp 8 is a collection of light pipes 30, 32 assembled together, although a single light pipe can also be employed. In the center of the lamp 8 is the light exiting surface 12 of the lamp's center light pipe 30. The light exiting surface 12 of the center light pipe 30 may non-flat as shown, or may be flat. The embodiment shown also comprises several light exiting surfaces 12 from adjacent light pipes 32. An exit surface rim 16 borders the adjacent light pipes 32 at the adjacent rim edge 36 of each of the adjacent light pipes. The exit surface rim 16 is used to mount or secure the lamp 8 to a structure, such as an automobile. The lamp's center light pipe 30 borders the adjacent light pipes 32 at the radially inward arc edges 34 of the adjacent light pipes 32. Each light pipe 30, 32 has a light receiving end 10 at the opposite end from the light exiting end 13. Each adjacent light pipe 32 and the center light pipe 30 is coupled with or provided with a light source, such as an individual light-emitting diodes (LED) 18. The LED 18 has one or more electrical connectors 21, as shown in FIGS. 4, 6, and 7 and attaches to an LED platform 22 by an LED clip 20 or by any other suitable attachment device.

The light receiving end 10 serves to introduce light into the light pipe 30, 32. Each light receiving end 10 is the narrower end of the light pipe, while each light exiting end 13 is the wider end of the light pipe. When the light source is positioned at the focal point of a parabolic surface, such as those surfaces 15 disclosed in the light units of the invention, some of the light strikes the parabolic surface. The light reflected from the parabolic surface travels in a trajectory generally parallel to the axis of revolution of the parabolic surface. The lamp thus produces a well-collimated light.

As shown in FIGS. 3 and 4, the center light pipe 30 has the light exiting surface 12 and one or more side surfaces 14.

The side surface 14 is shown as a conical surface 19, although other shapes can be used. FIG. 4 shows the light receiving end 10 and side surface 14. FIG. 4 also shows an LED receptacle 38 at the light receiving end 10. The LED receptacle 38 includes a light receiving surface 11 and rim-shaped or collar-shaped flange 28 having an edge 26. The light receiving surface 11 and light exiting surface 12 are preferably perpendicular to longitudinal axis A. The light receiving end 10 is coupled with the LED 18 by placing the edge 26 of the flange 28 on the LED platform 22. The light receiving surface 11 is spaced apart from the LED platform 22 by the height of the flange 28. The LED 18 fits into the LED receptacle 38 of the center light pipe 30. The LED receptacle 38 is preferably round, but may be of any shape suitable for receiving and coupling with a light source. The LED receptacle 38 is preferably coupled with an LED, but may be coupled with any other suitable light source.

The receptacle flange 28 shown in FIG. 4 (and also shown in FIG. 6) acts as a spacer between the LED platform 22 and the light receiving surface 11. In a preferred embodiment, the flange 28 is a contiguous band, forming a collar-like structure at the periphery of the LED 18. The flange 28 may also be a non-contiguous band and be formed of a series of individual wall-like structures or segments at the periphery of the light receiving end 10 adapted to surround the periphery of the LED 18. The flange 28 also serves to contain the LED 18.

FIGS. 5 and 6 each show an adjacent light pipe 32. It should be understood that a center light pipe 30 such as is shown in FIGS. 3 and 4 is employed in a preferred embodiment, but a center light pipe 30 is not essential to the invention. The invention may be practiced with light pipes of the shape similar to adjacent light pipes 32. The adjacent light pipe 32 in FIG. 5 includes the light exiting surface 12 and side surfaces 14. The light exiting surface 12 is framed by adjacent borders 40, an adjacent radially inward arc edge 34, and adjacent rim edge 36. The light receiving surface 11 and light exiting surface 12 are preferably perpendicular to longitudinal axis B. FIG. 6 also shows the LED receptacle 38, which is functionally similar to the LED receptacle 38 of FIG. 4. Although this is circular, it can be of other, non-circular shapes.

The light pipes preferably employ a blended transitional parabolic profile design. The light pipe contour smoothly and gradually transitions from a circular cross-sectional shaped light receiving end 10 to a quadrilateral cross-sectional shape at the light exiting end 13. A quadrilateral is defined as a polygon bounded by four line segments, each of which can be of any length. The blended transitional parabolic profile design assures that each intersection between a parabolic surface 15 used in the light pipes 32 and an intersecting hypothetical plane which is not perpendicular to the axis of the parabolic surface is in the general shape of a parabola. In a preferred embodiment, the light pipe is solid, but may be filled with air, a liquid, a semisolid or any other material having an optical index of refraction significantly higher than that of air (approximately one). In a preferred embodiment, the side surface 14 is preferably generally smooth and preferably generally curved, but may be generally flat. Although it is preferred that at least a substantial portion of the side surface 14 of the light pipes is generally parabolic in shape, it is to be understood that other curved or even straight surfaces can be used.

As shown in FIG. 7, a light unit 49 includes a light source such as the LED 18 and a light pipe 32. The LED 18 projects electromagnetic radiation or light 44 toward the light receiving surface 11 of the light pipe 32. The light receiving surface 11 is preferably hyperbolic but can be flat any other suitable contour. The LED 18 has a lens, which is preferably hyperbolic. The lens can be flat any other suitable contour. In a preferred embodiment, each light pipe has a dedicated LED 18. The term "dedicated" means the light from a single LED 18 is projected into a single light pipe, providing a one-to-one correspondence between each light source and each light pipe. The light within the solid light pipe is an intra solid beam 46. A portion of the intra solid beam 46 reaches the light exiting end 13 directly, and the remainder of the intra solid beam 46 reflects from the side surfaces 15, 17. The intra-solid beam 46 travels roughly parallel to longitudinal axis B. Both the direct light and the reflected light exit the light exiting end 13 as an output beam 48. Although a light unit 49 can have an adjacent light pipe 32 in combination with a dedicated LED 18, a center light pipe 30 in combination with a dedicated LED 18 is also a light unit 49.

The LED's 18 produce a more desirable intra-solid beam 46 when centered in the LED receptacle 38. One embodiment of the lamp 8 employs a light receiving surface 11 in direct contact with the LED 18. Preferably, the LED 18 is positioned at the focal point 42 of the parabolic surface 15 of the light pipe 32 for maximum collimation of light. The light receiving surface 11 can be either flat or curved, such as hemispherical in shape. A hemispherical light receiving surface 11 produces a more intense intra-solid beam 46 and consequently a brighter output beam 48.

Light is transmitted from the narrower, light receiving end 10 of each light pipe to the other wider light exiting end 13 end of the light pipe according to the invention. In one embodiment of the invention, one or more light exiting surfaces 12 are shaped to redirect the light received from the light receiving end 10 in a direction that would be better visible to the driver of another automobile, for example. The light exiting surface 12 can be flat or curved. A flat light exiting surface 12 is used when it is desired that the output beam 48 be directed, such as in an automobile headlight. A curved light exiting surface 12 is used when the output beam 48 is intended to be spread, such as when used in an automobile turn signal or brake light.

Electromagnetic radiation, such as light, enters the light pipe through the light receiving end 10 as the electromagnetic radiation beam 44 and becomes an intra-solid beam 46. The light pipe is a preferably paraboloid-like structure, having at least one generally parabolic shaped surface. Then, as the intra-solid beam 46 reaches the light exiting end 12 the light exits the surface as an output beam 48. The output beam 48 can be further directed to another a person within the line of sight of an automobile, for example. Light from the intra-solid beam 46 does not escape from the light pipe side surface 14. The light pipe preferably provides nearly total internal reflection.

Figure 8:
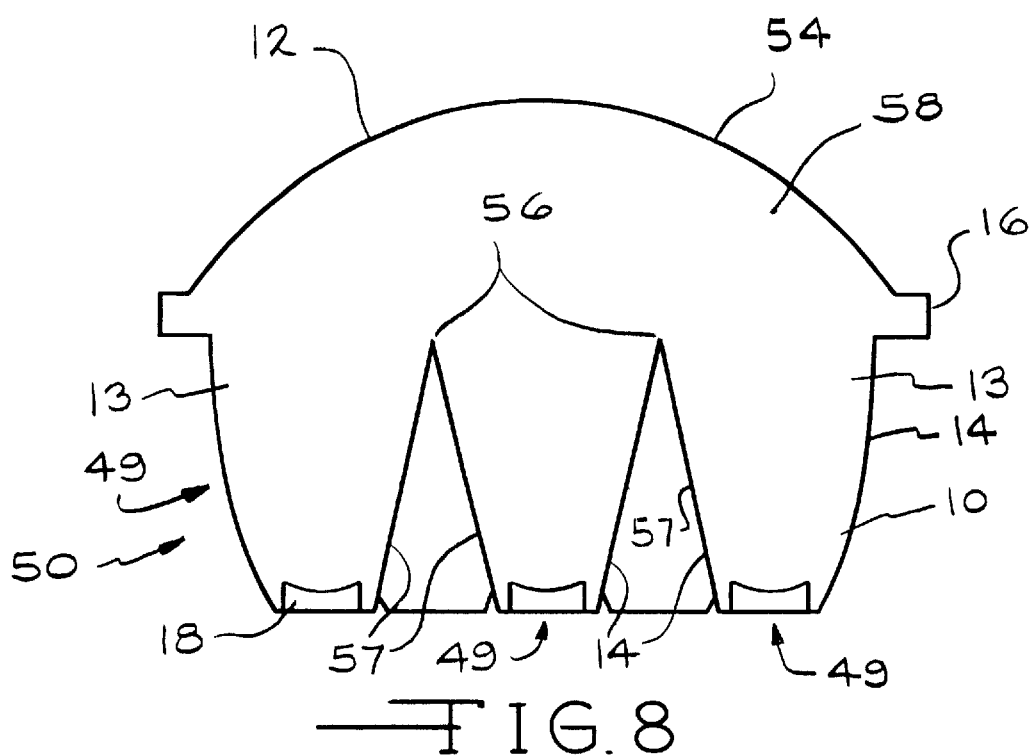
FIG. 8 is a cross-sectional view in elevation of a different embodiment of the lamp.

The light exiting surfaces 12 of all the light pipes 30, 32 disclosed above are positioned at the light exiting ends 13 of each light pipe. In another embodiment of the invention, several light pipes are merged together at their light exiting ends 13 so that the light exiting surfaces 12 are not at the light exiting ends 13 of the light pipes. Instead, the light exiting surfaces 12 are spaced apart from the light exiting ends 13. In such an embodiment, a single light exiting surface 12 emanates light from several light pipes. An example of this is shown in FIG. 8 where the lamp 50 includes a plurality of light units 49 and a single light exiting surface 12 in the form of a lens top 54. The lens top is preferably smooth at the surface most distant from the light units 49, but may be shaped or faceted. The side surfaces 14 of the light pipes 57 intersect with each other to form cusps 56 and a supra-cusp region 58. The light pipes' side surfaces 14 join at about the cusps 56. The material under the lens top 54 is preferably solid but may be filled with air, or a semi-solid or liquid material. The area above the cusps 56 and below the lens top 54 is a supra-cusp region 58.

Figure 9:
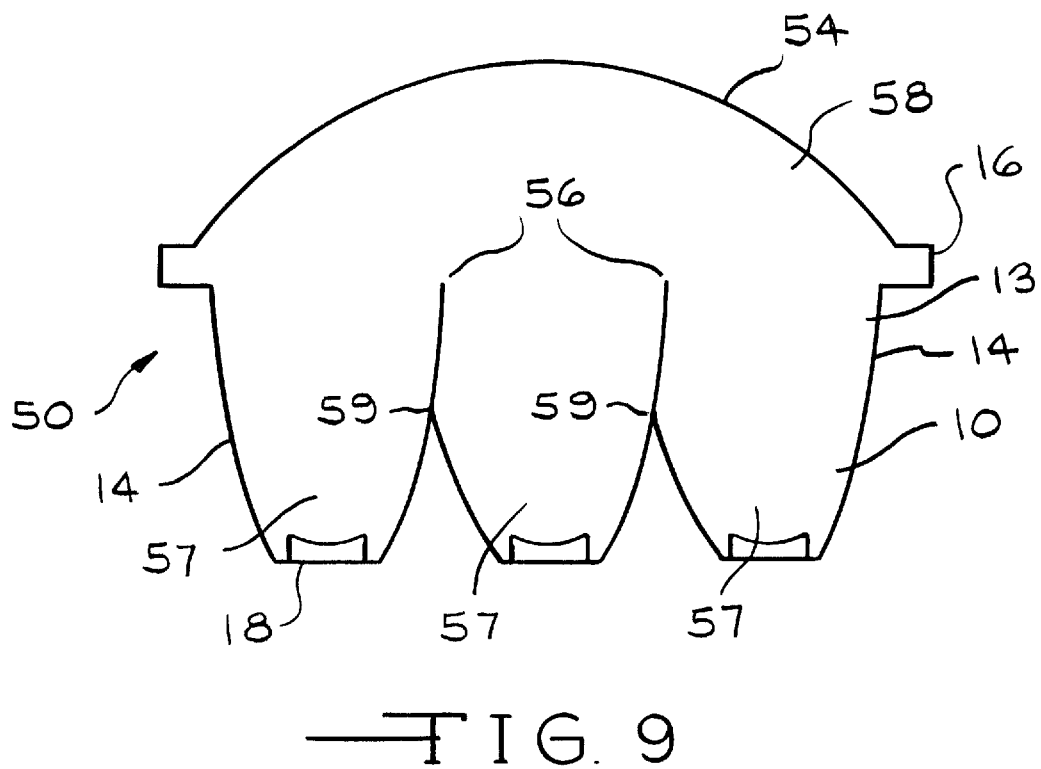
FIG. 9 is a view similar to FIG. 8 with different intersection points.

FIG. 9 is a cross sectional view of a plurality of light pipes 57 having side surfaces 14 that join at intersections 59 below the supra-cusp region 58 and below the cusps 56. It will be appreciated that the light exiting end 13 is at the point of the cusps 56, not where the side surfaces 14 join together at the intersections 59.

Figure 10:
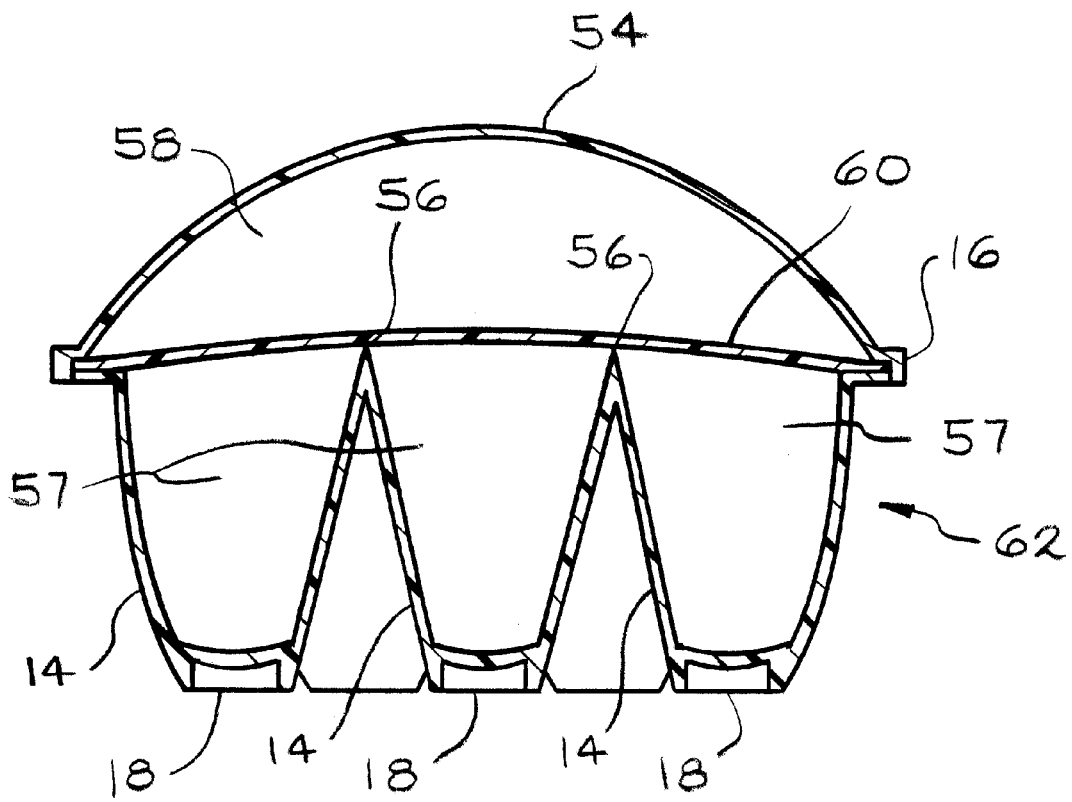
FIG. 10 is a view similar to FIG. 8 having a cusp border.

The lamp 62 shown in FIG. 10 differs from the lamp 50 in FIG. 8 in that there is a cusp border 60 that divides the light pipes 57 from the supra-cusp region 58. The cusp border 60 permits the supra-cusp region 58 to be filled with one medium, medium "A," and the light pipes 57 to be filled or manufactured from a medium "B." Media "A" and "B" can be the same or different media. The media can be a solid, liquid, gaseous, gel, or generally liquid material, or any other suitable material. The term "generally liquid material" includes liquids, gels, and semi-solid materials. When the light pipes 57 are filled with a medium rather than being solid, the side surfaces 14 must be of sufficient structural integrity to contain the medium.

LED's are capable of producing and emitting light of a wide array of colors, including a generally reddish and generally yellowish color. The generally reddish and generally yellowish colors are of particular use in automobile applications. Where the LED produces a whitish light, the output beam 48 may pass through an additional colored lens in automobile applications. The additional colored lens may be in contact with the lamp. For lamp embodiments using a lens top 54, the lens top itself may be colored or coated with a coloring substance. Likewise, the media that are used to manufacture or fill the non-solid light pipes, or supra cusp regions 58 may also be colored or coated with a coloring substance.

Figure 11:
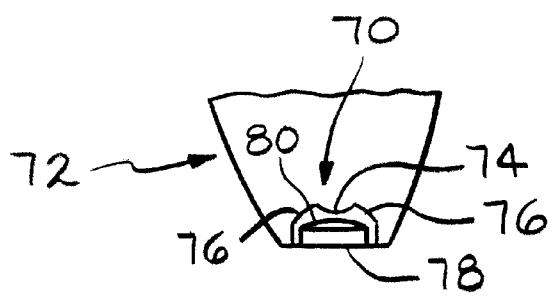
FIG. 11 is a partial view of a light pipe showing an alternate embodiment of a light receiving surface that can be used with the invention.

In the embodiment shown in FIG. 11, the light receiving surface 70 of the light pipe 72 contains a center portion 74 that is hyperbolic convex in shape, and a outer, annular portion 76 that is spherically concave in shape. The LED 78 has a surface 80 with a convex shape that generally fits the generally convex shape of the light receiving surface 70. It is to be understood that the light receiving surface can also be generally spherically concave, not shown, or can be generally flat, also not shown.

The light pipe of the invention is preferably manufactured from an optically clear medium. The assemblage of light pipes of the invention can be manufactured either in one piece or from multiple pieces. When manufacturing the invention in one piece, a material what will be optically clear when hardened can be injected into a mold and allowed to harden.

A multi-part thermoset manufacturing molding method can also be used, wherein an epoxy resin is cured in a mold to form an optically clear solid. When using the multi-part thermoset manufacturing method, the epoxy resin must be mixed very well and stabilized. Failure to do so can result in cloudy and optically uneven and less optically efficient light pipes.

Injection-compression molding is yet another way the light pipe of the invention can be manufactured. Using this technique, a liquid is injected into an open mold. When the mold is shut, the portion of the mold covering the mold opening compresses the material inside and completes the mold. Using the injection-compression method allows for better cooling in the manufacturing process and produces less stress on the light pipe of the invention.

When manufacturing the invention from two pieces, the light pipes can be manufactured separately from a lens piece. Manufacturing the lamp in two pieces avoids the uneven cooling, shrinking, sinking or pitting surfaces that sometimes occurs when manufacturing one piece with a medium that requires cooling. Manufacturing two pieces allows each light pipe and lens piece to be of a more uniform thickness. The two pieces can be joined using a clear adhesive and spin-weld technique, as well as joining the two pieces together and submerging them in a solution which joins them.

Also the part may be produced in a multi-shot injection molding process, whereby one shot is made by molding the outer surface of the body and a constant wall thickness from the retaining flange to the light entrance surfaces, then a second shot filling the part from the inside surface of said first shot, filling the inside volume to the brim of the retaining flange, then a third shot that fills the volume completely, forming on top of the first and second shots a lens exit surface as described above, for beam shaping.

The light pipe of the invention can be manufactured from clear polyurethane, which avoids uneven cooling, of the invention can also be manufactured from optically clear glass or any other optically clear substance.

The principle and mode of operation of this invention have been described in its preferred embodiments. However, it should be noted that this invention may be practiced otherwise than as specifically illustrated and described without departing from its scope.

What is claimed is:

1. A lamp for emanating light having two or more light units assembled together, each light unit comprising:
   a light pipe having side surfaces to direct light from a light receiving end to a light exiting end; and
   a dedicated light source;
   wherein at least two light pipes share a light exiting surface having a supra-cusp region, wherein the supra-cusp region is filled with a generally liquid material.

2. The lamp of claim 1, wherein at least one of the light sources is a light-emitting diode.

3. The lamp of claim 1, wherein at least a portion of a side surface of at least one of the light pipes is generally parabolic in shape.

4. The lamp of claim 1, wherein each light pipe is a dedicated light pipe.

5. The lamp of claim 1, wherein the light receiving surface of at least one light unit is generally curved in shape.

6. The lamp of claim 1, wherein at least one light exiting end is generally hemispheric in shape.

7. The lamp of claim 1, wherein at least one side surface is generally flat in shape.

8. The lamp of claim 1, wherein at least one side surface is generally curved in shape.

9. The lamp of claim 1, wherein the light pipes are rigid.

10. A lamp for emanating light having a plurality of light units arranged in a cluster, wherein:
   each light unit comprises a light source, a light pipe having a light receiving end to introduce light from the light source into the light pipe in the form of an intra-solid beam, and a light exiting end through which the light exits the pipe;
   said cluster of light units has a generally circular configuration with a central light unit surrounded by a plurality of light units; and each of said surrounding light units have at least one side surface, said side surface is generally flat in shape.

11. The lamp of claim 10, wherein the central light unit is generally conical in shape.

12. The lamp of claim 10, wherein each of said surrounding light units have at least one side surface, said side surface is generally parabolic in shape.

13. The lamp of claim 10, wherein each of said surrounding light units have at least one side surface, said side surface is generally curved in shape.

14. The lamp of claim 10, wherein each of said light units has a dedicated light source.

15. The lamp of claim 10, wherein the central light unit borders the surrounding light units at a radially inward arc edge of each of said surrounding light units.

16. The lamp of claim 10, wherein each of said light receiving ends is narrower than each of said light exiting ends of said light units.

17. The lamp of claims 10, wherein each of said light units is filled with one of air, a liquid, and a semisolid.

18. A lamp for emanating light having a plurality of light units arranged in a cluster, wherein:

- each light unit comprises a light source, a light pipe having a light receiving end to introduce light from the light source into the light pipe in the form of an intra-solid beam, and a light exiting end through which the light exits the pipe;
- said cluster of light units has a generally circular configuration with a central light unit surrounded by a plurality of light units; and
- each of said surrounding light units has at least one side surface, said side surface being generally parabolic in shape.

* * * * *